(12) United States Patent
Rana et al.

(10) Patent No.: US 10,333,397 B2
(45) Date of Patent: Jun. 25, 2019

(54) MULTI-STAGE CHARGE PUMP CIRCUIT OPERATING TO SIMULTANEOUSLY GENERATE BOTH A POSITIVE VOLTAGE AND A NEGATIVE VOLTAGE

(71) Applicant: STMicroelectronics International N.V., Schiphol (NL)

(72) Inventors: Vikas Rana, Noida (IN); Abhishek Mittal, Ghaziabad (IN)

(73) Assignee: STMicroelectronics International N.V., Schiphol (NL)

( * ) Notice: Subject to any disclaimer, the term of this patent is extended or adjusted under 35 U.S.C. 154(b) by 0 days.

(21) Appl. No.: 15/652,748

(22) Filed: Jul. 18, 2017

(65) Prior Publication Data
US 2019/0028026 A1    Jan. 24, 2019

(51) Int. Cl.
*H02M 3/07* (2006.01)

(52) U.S. Cl.
CPC ...... *H02M 3/073* (2013.01); *H02M 2003/071* (2013.01)

(58) Field of Classification Search
USPC ........................................ 327/172, 173, 175
See application file for complete search history.

(56) References Cited

U.S. PATENT DOCUMENTS

| | | | |
|---|---|---|---|
| 3,761,899 A | 9/1973 | McKenny et al. | |
| 4,053,821 A | 10/1977 | Hose, Jr. et al. | |
| 4,199,806 A | 4/1980 | Patterson, III | |
| 4,236,199 A | 11/1980 | Stewart | |
| 4,703,500 A | 10/1987 | Pollard | |
| 4,748,295 A | 5/1988 | Rogers | |
| 4,922,402 A | 5/1990 | Olivo et al. | |
| 4,970,409 A | 11/1990 | Wada et al. | |
| 5,003,197 A | 3/1991 | Nojima et al. | |
| 5,058,063 A | 10/1991 | Wada et al. | |
| 5,280,420 A | 1/1994 | Rapp | |
| 5,426,334 A | 6/1995 | Skovmand | |
| 5,481,221 A | 1/1996 | Gariboldi et al. | |
| 5,581,455 A | 12/1996 | Rossi et al. | |
| 5,812,018 A * | 9/1998 | Sudo .................... | H02M 3/073 307/110 |
| 5,914,632 A | 6/1999 | Fotouhi et al. | |
| 6,023,188 A * | 2/2000 | Lee ......................... | G05F 3/20 327/536 |

(Continued)

*Primary Examiner* — Adam D Houston
(74) *Attorney, Agent, or Firm* — Crowe & Dunlevy

(57) ABSTRACT

A charge pump includes boosting circuits cascade coupled between first and second nodes, wherein each boosting circuit is operable in both a positive voltage boosting mode to positively boost voltage and a negative voltage boosting mode to negatively boost voltage. A first switching circuit selectively applies a first voltage to one of the cascaded boosting circuits in response to a first logic state of a periodic enable signal, with the cascaded boosting circuits operating in the positive voltage boosting mode to produce a high positive voltage at the second node. A second switching circuit selectively applies a second voltage to another of the cascaded boosting circuits in response to a second logic state of the periodic enable signal, with the cascaded boosting circuits operating in the negative voltage boosting mode to produce a high negative voltage at the first node. Simultaneous output of the positive and negative voltages is made.

28 Claims, 3 Drawing Sheets

(56) References Cited

U.S. PATENT DOCUMENTS

| | | | |
|---|---|---|---|
| 6,184,741 B1* | 2/2001 | Ghilardelli | G11C 5/145 327/536 |
| 6,232,752 B1 | 5/2001 | Bissell | |
| 6,282,135 B1 | 8/2001 | Proebsting | |
| 6,418,040 B1* | 7/2002 | Meng | F28D 5/00 307/109 |
| 6,429,724 B1* | 8/2002 | Ogura | H02M 3/073 327/390 |
| 6,483,728 B1 | 11/2002 | Johnson et al. | |
| 6,525,949 B1 | 2/2003 | Johnson et al. | |
| 7,199,641 B2 | 4/2007 | Wei | |
| 7,304,530 B2 | 12/2007 | Wei et al. | |
| 7,477,093 B2* | 1/2009 | Al-Shamma | H02M 3/073 327/536 |
| 7,719,343 B2 | 5/2010 | Burgener et al. | |
| 8,085,604 B2 | 12/2011 | Ng | |
| 8,154,333 B2 | 4/2012 | Ker et al. | |
| 8,362,824 B2 | 1/2013 | Wong et al. | |
| 8,378,736 B2 | 2/2013 | Burgener et al. | |
| 8,378,737 B2 | 2/2013 | Ker et al. | |
| 8,441,841 B2 | 5/2013 | Nagatsuka et al. | |
| 8,482,340 B2 | 7/2013 | Shay et al. | |
| 9,209,757 B1 | 12/2015 | Thandri et al. | |
| 9,634,562 B1 | 4/2017 | Rana et al. | |
| 10,069,323 B2* | 9/2018 | Uno | H02M 3/156 |
| 2001/0022735 A1* | 9/2001 | Zanuccoli | H02M 3/073 363/60 |
| 2001/0033254 A1 | 10/2001 | Furusato et al. | |
| 2003/0141530 A1 | 7/2003 | Kaneko et al. | |
| 2003/0146476 A1 | 8/2003 | Kaneko et al. | |
| 2003/0164511 A1 | 9/2003 | Kaneko et al. | |
| 2003/0173609 A1 | 9/2003 | Kaneko et al. | |
| 2004/0080964 A1* | 4/2004 | Buchmann | H02M 3/07 363/60 |
| 2004/0246044 A1 | 12/2004 | Myono et al. | |
| 2004/0246246 A1 | 12/2004 | Tobita | |
| 2005/0052220 A1 | 3/2005 | Burgener et al. | |
| 2005/0062520 A1 | 3/2005 | Kim et al. | |
| 2006/0076935 A1* | 4/2006 | Wiseman | B64G 1/405 322/20 |
| 2006/0158923 A1* | 7/2006 | Namekawa | G11C 5/145 365/149 |
| 2006/0164155 A1* | 7/2006 | Ragone | G11C 5/145 327/536 |
| 2007/0001746 A1 | 1/2007 | Wei | |
| 2007/0096796 A1 | 5/2007 | Firmansyah et al. | |
| 2008/0048765 A1 | 2/2008 | Nonaka | |
| 2008/0100370 A1 | 5/2008 | Chen et al. | |
| 2008/0150619 A1 | 6/2008 | Lesso et al. | |
| 2008/0174360 A1 | 7/2008 | Hsu | |
| 2008/0238535 A1 | 10/2008 | Horibata | |
| 2009/0080257 A1 | 3/2009 | Oka et al. | |
| 2009/0289731 A1 | 11/2009 | Yang | |
| 2010/0214010 A1 | 8/2010 | Burgener et al. | |
| 2010/0277152 A1 | 11/2010 | MacFarlane | |
| 2010/0327959 A1 | 12/2010 | Lee | |
| 2011/0050327 A1 | 3/2011 | Fujitani | |
| 2011/0084757 A1 | 4/2011 | Saman et al. | |
| 2011/0121864 A1 | 5/2011 | Maeda et al. | |
| 2011/0234306 A1 | 9/2011 | Hioka et al. | |
| 2012/0062291 A1 | 3/2012 | Saitoh | |
| 2012/0249224 A1 | 10/2012 | Wei et al. | |
| 2013/0093503 A1 | 4/2013 | Kok et al. | |
| 2013/0113546 A1 | 5/2013 | Shay et al. | |
| 2013/0314151 A1 | 11/2013 | Lesso | |
| 2013/0328824 A1 | 12/2013 | Krah et al. | |
| 2014/0055194 A1 | 2/2014 | Burgener et al. | |
| 2015/0002214 A1 | 1/2015 | Englekirk | |
| 2015/0015323 A1 | 1/2015 | Rahman et al. | |
| 2015/0214837 A1 | 7/2015 | Ogawa | |
| 2015/0270775 A1 | 9/2015 | Ma | |
| 2015/0288353 A1* | 10/2015 | Kalluru | H03K 5/023 365/185.12 |
| 2015/0303920 A1* | 10/2015 | Friedman | H03K 19/018521 326/81 |
| 2015/0372590 A1 | 12/2015 | Seshita | |
| 2016/0191022 A1 | 6/2016 | Burgener et al. | |
| 2016/0344297 A1* | 11/2016 | Lee | H02M 3/33584 |
| 2017/0149331 A1* | 5/2017 | Kruiskamp | H02M 3/073 |
| 2017/0317582 A1* | 11/2017 | Leong | H02M 1/14 |

* cited by examiner

MULTI-STAGE CHARGE PUMP CIRCUIT OPERATING TO SIMULTANEOUSLY GENERATE BOTH A POSITIVE VOLTAGE AND A NEGATIVE VOLTAGE

TECHNICAL FIELD

The present invention relates to a multi-stage charge pump circuit for the generation of positive and negative voltages.

BACKGROUND

A charge-pump circuit is a type of circuit configured to provide a voltage with a high voltage level that is either more positive than a power supply voltage (referred to as a high positive voltage) or has a reverse polarity with respect to the power supply voltage (referred to as a high negative voltage). In many circuit applications, both the high positive voltage and the high negative voltage are required, and it is common for these voltages to be generated on-chip. To that end, the conventional solution is to include two distinct charge-pump circuits, one for generating the needed high positive voltage and another for generating the needed high negative voltage. The drawbacks associated with this conventional solution are: an increased area on chip that is occupied by the two distinct charge-pump circuits (more specifically with respect to the needed capacitors and resistors) and an increase in power consumption.

Depending on the magnitudes of the needed high positive voltage and high negative voltage, a multi-stage charge pump circuit may be required for each voltage generator circuit. The use of multiple stages to acquire the desired voltage magnitudes can have adverse consequences in terms reduced efficiency and reduced reliability. Additionally, separate voltage generators for generating the high positive voltage and high negative voltage require separate clock buffer circuits to drive the capacitive switching operation, and this can result in an undesirable increase in on chip current consumption.

There is a need in the art for a multi-stage charge pump circuit that addresses the foregoing and other problems to support the simultaneous generation of both a high positive voltage and a high negative voltage from a common charge pump circuit.

SUMMARY

In an embodiment, a charge pump circuit comprises: a plurality of boosting circuits coupled in cascade between a first node and a second node, wherein each boosting circuit has an A node and a B node and is operable in a positive voltage boosting mode to positively boost voltage from the A node to the B node and is operable in a negative voltage boosting mode to negatively boost voltage from the B node to the A node; a first switching circuit configured to apply a first voltage at the A node of one of the boosting circuits in said plurality of boosting circuits in response to a first logic state of a periodic enable signal so that boosting circuits of said plurality of boosting circuits operate in the positive voltage boosting mode to produce a high positive voltage at the second node; and a second switching circuit configured to apply a second voltage at the B node of another of the boosting circuits in said plurality of boosting circuits in response to a second logic state of said periodic enable signal so that boosting circuits of said plurality of boosting circuits operate in the negative voltage boosting mode to produce a high negative voltage at the first node.

In an embodiment, a method is presented for controlling operation of a plurality of boosting circuits coupled in cascade between a first node and a second node, wherein each boosting circuit has an A node and a B node and is operable in a positive voltage boosting mode to positively boost voltage from the A node to the B node and is operable in a negative voltage boosting mode to negatively boost voltage from the B node to the A node. The method comprises: applying a first voltage at the A node of one of the boosting circuits in said plurality of boosting circuits in response to a first logic state of an enable signal so that boosting circuits of said plurality of boosting circuits operate in the positive voltage boosting mode to produce a high positive voltage at the second node; storing charge from said high positive voltage at a positive voltage output; applying a second voltage at the B node of another of the boosting circuits in said plurality of boosting circuits in response to a second logic state of said enable signal so that boosting circuits of said plurality of boosting circuits operate in the negative voltage boosting mode to produce a high negative voltage at the first node; storing charge from said high negative voltage at a negative voltage output; and cyclically switching between the first and second logic states to simultaneously generate a positive voltage at the positive voltage output and a negative voltage at the negative voltage output.

BRIEF DESCRIPTION OF THE DRAWINGS

For a better understanding of the embodiments, reference will now be made by way of example only to the accompanying figures in which.

DETAILED DESCRIPTION

Figure 1:
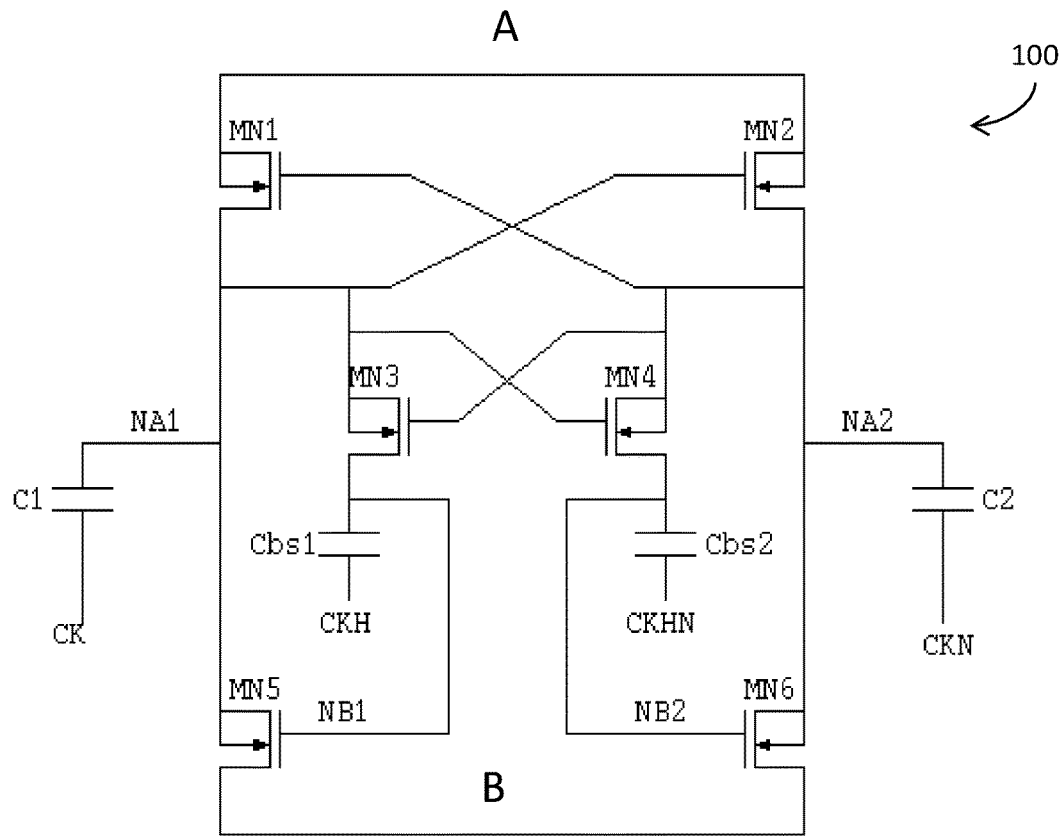
FIG. 1 is a circuit diagram for a voltage doubler.

Reference is now made to FIG. 1 showing a circuit diagram for a voltage doubler circuit (stage) 100. The circuit 100 includes an n-channel MOS transistor MN1 having a source terminal coupled to node A and a drain terminal coupled to node NA1 (i.e., having a source-drain path coupled between node A and node NA1) and an n-channel MOS transistor MN2 having a source terminal coupled to node A and a drain terminal coupled to node NA2. The transistors MN1 and MN2 are cross-coupled with the gate terminal of transistor MN1 coupled to the drain terminal of transistor MN2 at node NA2 and the gate terminal of transistor MN2 coupled to the drain terminal of transistor MN1 at node NA1.

The circuit 100 further includes an n-channel MOS transistor MN3 having a source terminal coupled to node NA1 and a drain terminal coupled to node NB1 and an n-channel MOS transistor MN4 having a source terminal coupled to node NA2 and a drain terminal coupled to node NB2. The transistors MN3 and MN4 are cross-coupled with the gate terminal of transistor MN3 coupled to the source terminal of transistor MN4 at node NA2 and the gate terminal of transistor MN4 coupled to the source terminal of transistor MN3 at node NA1.

The circuit 100 still further includes an n-channel MOS transistor MN5 having a drain terminal coupled to node B and a source terminal coupled to node NA1 and an n-channel MOS transistor MN6 having a drain terminal coupled to node B and a source terminal coupled to node NA2. The gate terminal of transistor MN5 is coupled to node NB1 and the gate terminal of transistor MN6 is coupled to node NB2.

A capacitor C1 has one terminal coupled to node NA1 and another terminal coupled to receive a clock signal CK. A capacitor C2 has one terminal coupled to node NA2 and another terminal coupled to receive a clock signal CKN (which is a logical inversion of the clock signal CK). A bootstrapping capacitor Cbs1 has one terminal coupled to node NB1 and another terminal coupled to receive a clock signal CKH. A bootstrapping capacitor Cbs2 has one terminal coupled to node NB2 and another terminal coupled to receive a clock signal CKHN (which is a logical inversion of the clock signal CHK).

Figure 2:
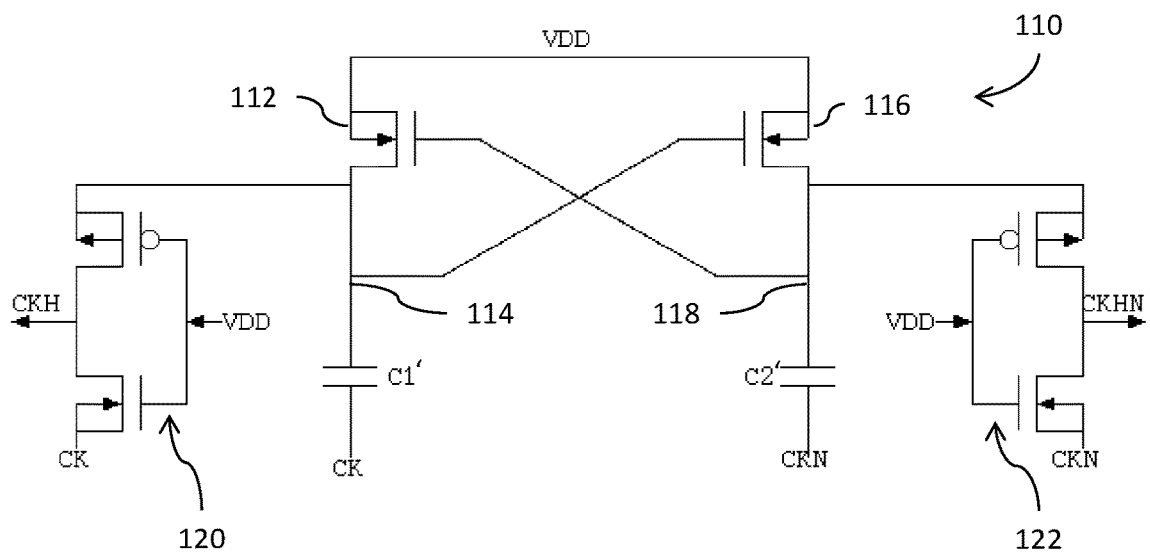
FIG. 2 is a circuit diagram for a clock voltage boosting circuit.

The clock signals CKH and CKHN are generated from the clock signals CK and CKN using a clock voltage boosting circuit 110 shown in FIG. 2. The circuit 110 includes an n-channel MOS transistor 112 having a source terminal coupled to a positive supply voltage node VDD and a drain terminal coupled to node 114. The circuit 110 further includes an n-channel MOS transistor 116 having a source terminal coupled to the supply voltage node VDD and a drain terminal coupled to node 118. The transistors 112 and 116 are cross-coupled with the gate terminal of transistor 112 coupled to the drain terminal of transistor 116 at node 118 and the gate terminal of transistor 116 coupled to the drain terminal of transistor 112 at node 114.

A capacitor C1' has one terminal coupled to node 114 and another terminal coupled to receive the clock signal CK. A capacitor C2' has one terminal coupled to node 118 and another terminal coupled to receive the clock signal CKN.

A CMOS inverter 120 has an input coupled to the supply voltage node VDD and an output generating the clock signal CKH. A source terminal of the p-channel MOS transistor in inverter 120 is coupled to the node 114 and a source terminal of the n-channel MOS transistor in inverter 120 is coupled to receive the clock signal CK.

A CMOS inverter 122 has an input coupled to the supply voltage node VDD and an output generating the clock signal CKHN. A source terminal of the p-channel MOS transistor in inverter 122 is coupled to the node 118 and a source terminal of the n-channel MOS transistor in inverter 122 is coupled to receive the clock signal CKN.

Figure 3A:
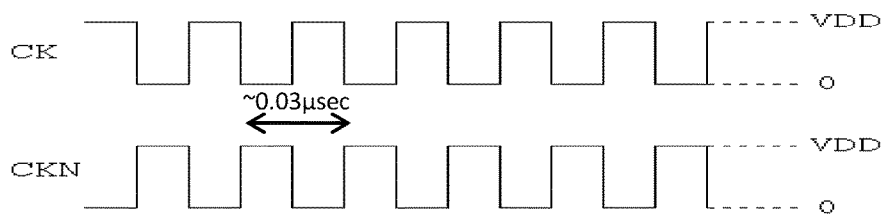
FIGS. 3A and 3B show clock signal waveforms.
Figure 3B:
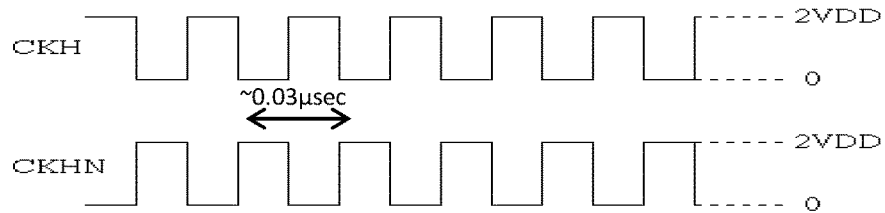

The clock voltage boosting circuit 110 functions to level shift the clock signals CK and CKN to generate the clock signals CKH and CKHN. FIG. 3A shows the waveforms for the clock signals CK and CKN. FIG. 3B shows the waveforms for the clock signals CKH and CKHN. It will be noted that the clock voltage boosting circuit 110 functions to boost the high voltage level of the clock signals CKH and CKHN to 2*VDD, with the high voltage level of the clock signals CK and CKN being VDD. The clock signals CKH and CKHN have a same phase as the clock signals CK and CKN, respectively.

The voltage doubler circuit 100 of FIG. 1 is configurable for operation to generate either a positive voltage or a negative voltage. When the voltage doubler circuit 100 is to be used as a positive voltage doubler (i.e., operating in a high positive voltage mode), the supply voltage VDD is connected to node A and a high positive voltage of 2*VDD is generated at node B. Conversely, when the voltage doubler circuit 100 is to be used as a negative voltage doubler (i.e., operating in a high negative voltage mode), the ground supply voltage GND is connected to node B and a high negative voltage of −VDD is generated at node A.

The voltage doubler circuit 100 advantageously operates from just two clocks (CK/CKH and CKN/CKHN).

The voltage doubler circuit 100 operates as follows in the high positive voltage mode:

To begin, assume that no clock is present. In this situation, the nodes NA1 and NA2 will be charged to the VDD−Vt voltage level, where Vt is the threshold voltage of the n-channel MOS transistors MN1 and MN2. Now, assume the clock signal is applied. With the clock signal CK at the VDD voltage level and the clock signal CKN at the 0 (ground GND) voltage level, then the clock signal CKH is at the 2*VDD voltage level and the clock signal CKHN is at the ground voltage level. In this configuration, the node NA1 will shift to the 2*VDD−Vt voltage level and the node NA2 will shift to the VDD voltage level. Due to the cross coupling between transistors MN3 and MN4, the node NB1 will be charged to the 3*VDD voltage level and the node NB2 will be charged to the VDD voltage level. As the node NB1 is at the 3*VDD voltage level and the node NA1 is at the 2*VDD voltage level, the n-channel MOS transistor MN5 has sufficient Vgs (gate to source voltage) to pass the 2*VDD voltage from node NA1 to node B. In this way, a high positive voltage (higher than input supply voltage VDD) is generated and passed for output. So, during high positive voltage mode operation, the voltage VDD is applied at node A and the 2*VDD voltage is generated at node B. During the opposite phase of the clocks, the nodes NA1 and NA2 switch between the VDD voltage level and the 2*VDD voltage level. Similarly, the nodes NB1 and NB2 switch between the VDD voltage level and the 3*VDD voltage level.

It will be noted that the foregoing voltage levels are mentioned with the assumption of an ideal operating situation when there is no current load at the output and there is no charge loss.

The voltage doubler circuit 100 operates as follows in the high negative voltage mode:

With the ground reference voltage GND applied to node B, when the clock signal CKH transitions to the 2*VDD voltage level, the clock signal CK is simultaneously at the VDD voltage level, and the n-channel MOS transistor MN5 turns on and node NA1 is charged to the 0 (GND) voltage level. During the next clock cycle, the clock signal CKH switches from the 2*VDD voltage level to the ground voltage level, with the clock signal CK changing state from the VDD voltage level to ground voltage level, and the node NA1 accordingly transitions from the 0 voltage level to the −VDD voltage level. Also, the node NB1 discharges to the −VDD voltage level via the transistor MN3 and the switch off of the transistor MN5. In this way, the node NA1 also goes to the −VDD voltage level. Due to effect of the clock signals CKN and CKHN, the node NA2 is charged to the ground voltage level via transistor MN6. As the NA2 is at the ground voltage level, and the NA1 is at the −VDD voltage level, this configuration causes the transistor MN1 to turn on and pass the −VDD voltage level voltage to the node A. During this negative high voltage mode of operation, the nodes NA1 and NA2 switch between the ground voltage level and the −VDD voltage level, and vice versa. Similarly, the nodes NB1 and NB2 switch between the VDD voltage level and the −VDD voltage level, and vice versa.

The circuit 100 possesses at least the following advantages: a) a single circuit configuration can be used to generate either a positive or a negative voltage depending on the configured operating mode; b) there is no threshold voltage drop in output voltage so the efficiency of this voltage doubler circuit stage is improved; c) because a single voltage doubler circuit can be used for positive and negative voltage doubling operation, there is a reduction in occupied circuit area in comparison with some prior art circuits, and there is also a reduction in power consumption; d) the circuit uses n-channel MOS transistors only, so there is no condition of body-bias and junction stress that is common with some prior art circuits, and thus circuit reliability is not an issue; and e) the circuit uses a cross coupled architecture of NMOS switches, so there is no need for a non-overlapping clock scheme or a four phase clock scheme as is the case with some prior art circuits.

Figure 4:
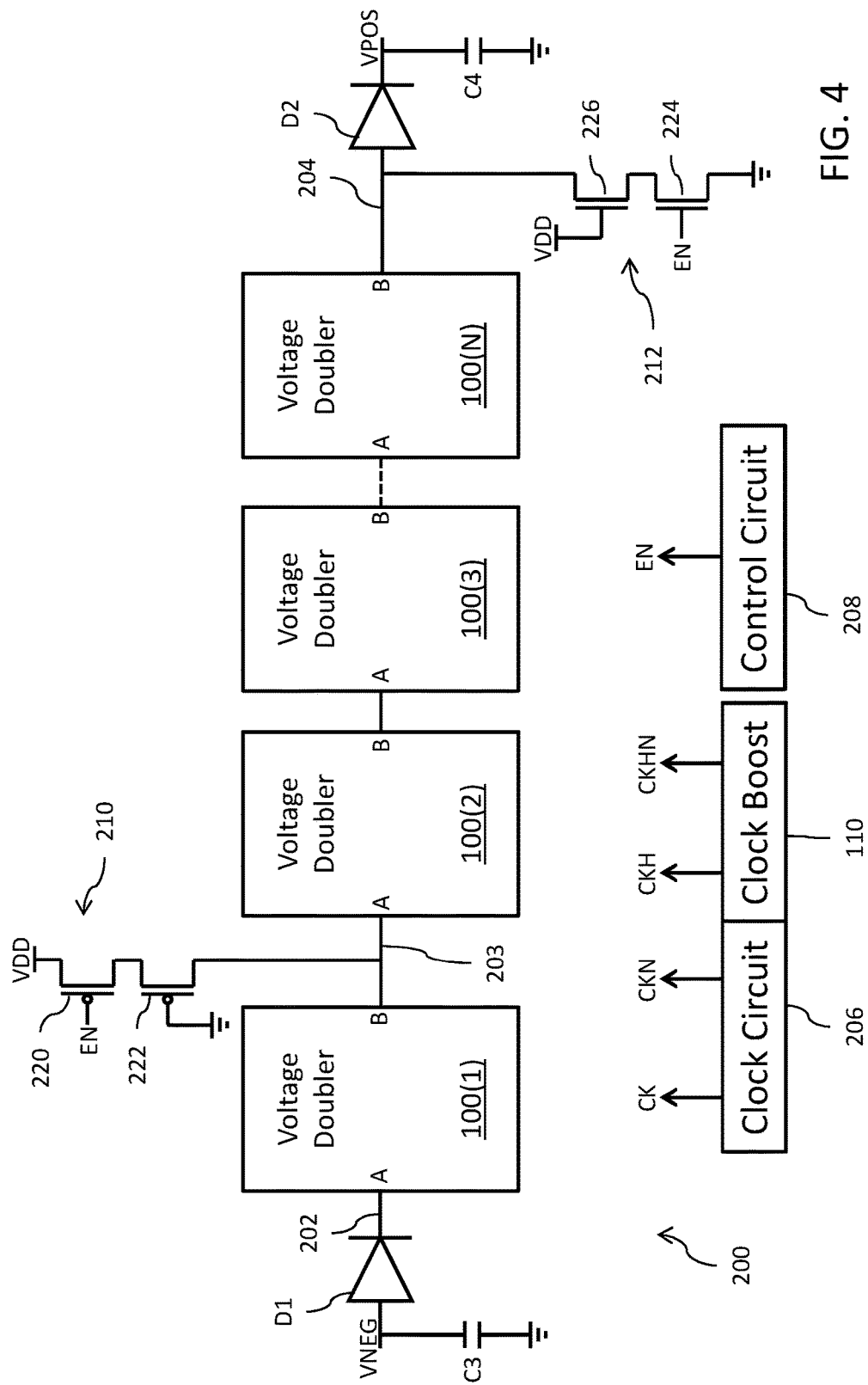
FIG. 4 is a circuit diagram for a charge pump formed from cascaded voltage doubler circuits of FIG. 1 that operates to simultaneously generate a high positive voltage and a high negative voltage by cyclically alternating between operation in a positive voltage mode and operation in a negative voltage mode.

Reference is now made to FIG. 4 showing a circuit diagram for a charge pump formed from cascaded voltage doubler circuits 100 of FIG. 1 that is simultaneously operable to generate a high positive voltage and generate a high negative voltage by cyclically alternating between operation in a positive voltage mode and operation in a negative voltage mode. The charge pump is a multi-stage charge pump circuit 200 using a plurality (N) of the voltage doubler circuits 100 coupled in cascade. In this example implementation, there are N=4 voltage doubler circuits 100 coupled in cascade, but it will be understood that N may be any suitably selected integer value dependent on the magnitudes of the high positive and negative voltages desired to be generated. The cascaded coupling of the voltage doubler circuits 100 permits operation of the multi-stage charge pump circuit 200 in both the high positive voltage mode to generate the high positive voltage at a positive output node (VPOS) and the high negative voltage mode to generate the high negative voltage at a negative output node (VNEG). In particular, the multi-stage charge pump circuit 200 is cyclically controlled to alternate between operation in the high positive voltage mode and operation in the high negative voltage mode, and separate voltage output terminals VPOS and VNEG are provided for supplying the high positive voltage and the high negative voltage, respectively. The alternate operation is controlled by the logic state of a periodic polarity control signal EN. When the polarity control signal EN is logic 0, the multi-stage charge pump circuit 200 is configured for operation responsive to the clock signals in the high positive voltage mode to generate an output voltage at the positive output node VPOS of VOUT≈N*VDD (it being noted that only N−1 of the stages 100 are used to generate this positive output voltage). Conversely, when the polarity control signal EN is logic 1, the multi-stage charge pump circuit 200 is configured for operation responsive to the clock signals in the high negative voltage mode to generate an output voltage at the negative output node VNEG of VOUT≈−N*VDD (it being noted that all N stages 100 are used to generate this negative output voltage). Responsive to the periodic polarity control signal EN, the multi-stage charge pump circuit 200 switches between the high positive voltage mode operation and the high negative voltage mode operation so as to simultaneously generate the high positive voltage at the output node VPOS and the high negative voltage at the output node VNEG, respectively.

A first diode D1 has an anode terminal coupled to the negative output node VNEG and a cathode terminal coupled to node 202. A capacitor C3 has a first terminal coupled to the negative output node VNEG and a second terminal coupled to a ground reference node. The capacitor C3 functions to store charge associated with the generated high negative output voltage. A second diode D2 has a cathode terminal coupled to the positive output node VPOS and an anode coupled to node 204. A capacitor C4 has a first terminal coupled to the positive output node VPOS and a second terminal coupled to a ground reference node. The capacitor C4 functions to store charge associated with the generated high positive output voltage.

The N voltage doubler circuits 100 are coupled in cascade between node 202 and node 204. The first voltage doubler circuit 100(1) has its node A coupled to node 202 and its node B coupled to node A of the second voltage doubler circuit 100(2). The second voltage doubler circuit 100(2) its node B coupled to node A of the third voltage doubler circuit 100(3). This connection sequence is repeated until the Nth voltage doubler circuit 100(N) which has its node A coupled to the node B of the immediately preceding voltage doubler circuit 100(N−1) and its node B coupled to node 204.

A clock circuit 206 and a clock voltage boosting circuit 110 (see, FIG. 2) generate the clock signals CK and CKN and the clock signals CKH and CKHN for application to the corresponding clock input nodes of each voltage doubler circuit 100 (see, FIG. 1). A control circuit 208 generates the polarity control signal EN. In a preferred implementation, the polarity control signal EN is a periodic signal whose frequency is much smaller (for example, about two orders of magnitude smaller) than the frequency of the clock signals CK and CKN and the clock signals CKH and CKHN. The control circuit 208 may be implemented as some form of a clock circuit.

The control circuitry for operating the cascaded voltage doubler circuits 100(2)-100(N) in the positive voltage mode to generate the high positive voltage and in the negative voltage mode to generate the high negative voltage includes a first switching circuit 210 and a second switching circuit 212. The first switching circuit 210 comprises a pMOS control transistor 220 source-drain coupled in series with a pMOS cascode transistor 222 between the supply voltage node VDD and the A node (also identified as node 203) of one of the voltage doubler circuits 100 in the cascaded voltage doubler circuits 100(2)-100(N). In the illustrated implementation, the selected one of the voltage doubler circuits 100 is the second voltage doubler circuit 100(2) for reasons of selecting the magnitude of the high positive voltage to equal the magnitude of the high negative voltage (although the A node of any one of the voltage doubler circuits 100 could be selected). The gate terminal of the pMOS control transistor 220 is coupled to receive the polarity control signal EN, and the gate terminal of the pMOS cascode transistor 222 is coupled to the ground reference node. The second switching circuit 212 comprises an nMOS control transistor 224 source-drain coupled in series with an nMOS cascode transistor 226 between the ground reference node and the B node of one of the voltage doubler circuits 100 in the cascaded voltage doubler circuits 100(2)-100(N). In the illustrated implementation, the selected one of the voltage doubler circuits 100 is the Nth voltage doubler circuit 100(N) so that the magnitude of the high negative voltage will equal the magnitude of the high positive voltage (although the B node of any one of the voltage doubler circuits 100 could be selected). The gate terminal of the nMOS control transistor 224 is coupled to receive the polarity control signal EN, and the gate terminal of the nMOS cascode transistor 226 is coupled to the supply voltage node VDD.

When the periodic polarity control signal EN is at logic 0, the multi-stage charge pump circuit 200 is configured for operation in the high positive voltage mode. The pMOS control transistor 220 is turned on (with the pMOS cascode transistor 222 also on in response to the ground bias at its gate terminal) and the supply voltage VDD is supplied to the A node of the second voltage doubler circuit 100(2). At the same time, the nMOS control transistor 224 is turned off to isolate node 204 from the ground voltage. Responsive to the clock signals CK and CKN and the clock signals CKH and CKHN, the second through Nth voltage doubler circuits 100(2)-100(N) will boost the input VDD voltage towards a voltage approximately equal to +N*VDD at the node 204. It will be noted that only N−1 stages of the voltage doubler circuits 100 are needed to reach the +N*VDD voltage. The diode D2 is forward biased by the voltage at node 204 and the capacitor C4 is charged (at the positive output node VPOS) towards a high positive voltage VOUT≈+N*VDD (more specifically to a voltage of +N*VDD−Vthd, where Vthd is the threshold voltage drop across the forward biased diode D2).

When the periodic polarity control signal EN is logic 1, the multi-stage charge pump circuit 200 is configured for operation in the high negative voltage mode. The nMOS control transistor 224 is turned on (with the nMOS cascode transistor 226 also on in response to the VDD bias at its gate terminal) and the ground reference voltage is supplied to the B node (also referred to as node 204) of the Nth voltage doubler circuit 100(N). At the same time, the pMOS control transistor 220 is turned off to isolate node 203 from the VDD voltage. Responsive to the clock signals CK and CKN and the clock signals CKH and CKHN, the Nth through first voltage doubler circuits 100(N)-100(1) will boost the input ground reference voltage towards a voltage approximately equal to −N*VDD at the node 202. It will be noted that all N stages of the voltage doubler circuits 100 are needed to reach the −N*VDD voltage. The diode D1 is forward biased by the voltage at node 202 and the capacitor C3 is charged (at the negative output node VNEG) towards a high negative voltage VOUT≈−N*VDD (more specifically to a voltage of −N*VDD+Vthd, where Vthd is the threshold voltage drop across the forward biased diode D1).

Figure 5:
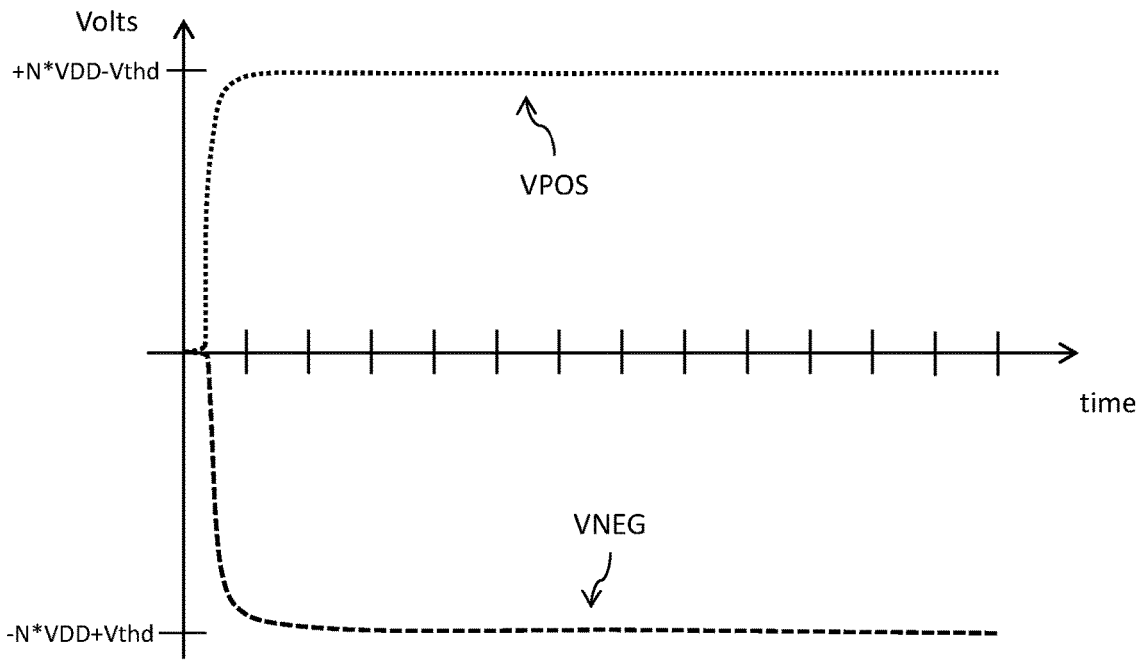
FIG. 5 is a timing diagram showing simultaneous generation of the positive and negative output voltages by the circuit of FIG. 4.

FIG. 5 illustrates a timing diagram for operation of the circuit 200 to simultaneously generate both the high positive voltage and the high negative voltage. The oscillation of the periodic polarity control signal EN cyclically alternates the charge pump 200 with the cascaded voltage doubler circuits 100 between the positive voltage mode and the negative voltage mode so that both the high positive voltage and the high negative voltage are simultaneously generated. In an example, implementation, stability in the high positive voltage and the high negative voltage may be achieved in less than about 200 μsec (with FIG. 5 showing an example with time divisions of 20 μsec).

Figure 6:
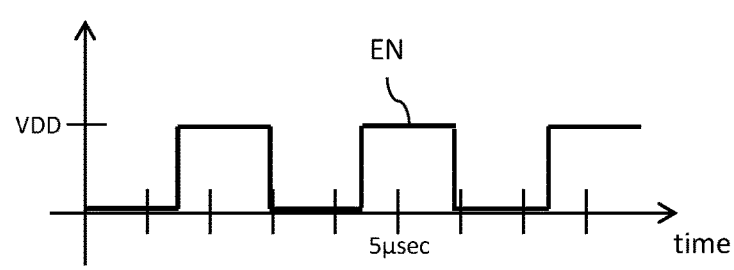
FIG. 6 is a timing diagram showing the periodic polarity control signal for controlling the circuit of FIG. 4 to alternately switch between the positive voltage mode and the negative voltage mode.

FIG. 6 is a timing diagram showing the periodic configuration of the polarity control signal EN. The divisions on the time axis are in increments of 1.5 μsec, and thus the polarity control signal EN has a period of about 3 μsec. To provide further context, the clock signals CK and CKN and the clock signals CKH and CKHN have a period of about 0.02-0.04 sec. Thus, the frequency of the clock signals is higher (for example, by about two orders of magnitude) than the frequency of the polarity control signal. The foregoing is just an example of the timing relationship. More specifically, the timing of the enable signal depends on the operating frequency of the clock signals as well as the output capacitive load and the output current load for both the positive and negative output voltages. The frequency relationship between the enable signal and the clock signals can be tuned by the circuit designer in accordance with operational requirements and specifications.

The charge pump 200 circuit presents a number of advantages including: 1) positive and negative voltage are generated simultaneously; 2) area of charge-pump used in this configuration is less than with prior art designs; 3) because of using a single circuit in both positive and negative charge-pump configuration the number of clock buffers are reduced so power is also less than with prior art designs; 4) additional complexity to design buffer to drive common load is not required so this solution is easy to implement; 5) due to usage of nMOS transistors for the voltage doubler circuits, there is no condition of body-bias and junction stress, so reliability is improved with this configuration; 6) use of cross coupled architecture of nMOS switches in the voltage doubler circuits does not require a non-overlapping clock scheme or four phase clock scheme, so power consumption and area occupation is reduced in comparison to prior art designs.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A charge pump circuit, comprising:
   a plurality of boosting circuits coupled in cascade between a first node and a second node, wherein each boosting circuit has an A node and a B node and is operable in a positive voltage boosting mode to positively boost voltage from the A node to the B node and is operable in a negative voltage boosting mode to negatively boost voltage from the B node to the A node;
   a first switching circuit configured to apply a first voltage at the A node of one of the boosting circuits in said plurality of boosting circuits in response to a first logic state of a periodic enable signal so that boosting circuits of said plurality of boosting circuits operate in the positive voltage boosting mode to produce a high positive voltage at the second node; and
   a second switching circuit configured to apply a second voltage at the B node of another of the boosting circuits in said plurality of boosting circuits in response to a second logic state of said periodic enable signal so that boosting circuits of said plurality of boosting circuits operate in the negative voltage boosting mode to produce a high negative voltage at the first node;
   wherein the periodic enable signal cyclically switches between the first and second logic states.

2. The charge pump circuit of claim 1, wherein each of the plurality of boosting circuits comprises:
   first and second intermediate nodes that are capacitively coupled to receive opposite phases of a first clock signal, respectively; and third and fourth intermediate nodes are capacitively coupled to receive opposite phases of a second clock signal, respectively.

3. The charge pump circuit of claim 2, wherein the first clock signal has a first high voltage level and wherein the second clock signal has a second high voltage level different from the first high voltage level.

4. The charge pump circuit of claim 3, wherein the second high voltage level is two times the first high voltage level.

5. The charge pump circuit of claim 2, wherein the first and second clock signals have aligned phases.

6. The charge pump circuit of claim 2, wherein the first and second clock signals have a frequency that is greater than a frequency of the periodic enable signal.

7. The charge pump circuit of claim 2, wherein each of the plurality of boosting circuits further comprises: a first transistor and second transistor connected in a cross-coupled configuration, wherein the first transistor is coupled between the A node and the first intermediate node and wherein the second transistor is coupled between the A node and the second intermediate node.

8. The charge pump circuit of claim 7, wherein each of the plurality of boosting circuits further comprises a third transistor and fourth transistor connected in a cross-coupled configuration, wherein the third transistor is coupled between the first intermediate node and the third intermediate node and wherein the fourth transistor is coupled between the second intermediate node and the fourth intermediate node.

9. The charge pump circuit of claim 8, wherein each of the plurality of boosting circuits further comprises:
a fifth transistor coupled between the first intermediate node and the B node and having a control terminal coupled to the third intermediate node; and
a sixth transistor coupled between the second intermediate node and the B node and having a control terminal coupled to the fourth intermediate node.

10. The charge pump circuit of claim 9, wherein the first through sixth transistors are all n-channel MOS transistors.

11. The charge pump circuit of claim 7, wherein each of the plurality of boosting circuits further comprises:
a fifth transistor coupled between the first intermediate node and the B node and having a control terminal coupled to the third intermediate node; and
a sixth transistor coupled between the second intermediate node and the B node and having a control terminal coupled to the fourth intermediate node.

12. The charge pump circuit of claim 1, wherein the first voltage is a positive voltage and the second voltage is a ground voltage.

13. The charge pump circuit of claim 1, wherein the first switching circuit comprises:
a switching transistor that is gate controlled by said periodic enable signal; and
a cascode transistor coupled in series with the switching transistor between the first voltage and the A node of said one of the boosting circuits in said plurality of boosting circuits.

14. The charge pump circuit of claim 13, wherein the cascode transistor is biased to be always turned on.

15. The charge pump circuit of claim 1, wherein the second switching circuit comprises:
a switching transistor that is gate controlled by said periodic enable signal; and
a cascode transistor coupled in series with the switching transistor between the second voltage and the B node of said another of the boosting circuits in said plurality of boosting circuits.

16. The charge pump circuit of claim 15, wherein the cascode transistor is biased to be always turned on.

17. The charge pump circuit of claim 1, wherein cascade coupling of boosting circuits comprises a direct electrical connection of B node to the A node of adjacent boosting circuits in the plurality of boosting circuits.

18. The charge pump circuit of claim 1, further comprising:
a first diode having a cathode coupled to the first node and an anode coupled to a negative voltage output node; and
a second diode having an anode coupled to the second node and a cathode coupled to a positive voltage output node; and
wherein the high negative voltage and the high positive voltage are simultaneously available at the negative voltage output node and positive voltage output node, respectively, in response to the cyclical switching of the periodic enable signal between the first and second logic states.

19. The charge pump circuit of claim 18, further comprising:
a first capacitor having a first terminal coupled to the negative voltage output node and a second terminal coupled to a ground node; and
a second capacitor having a first terminal coupled to the positive voltage output node and a second terminal coupled to a ground node.

20. A method for controlling operation of a plurality of boosting circuits coupled in cascade between a first node and a second node, wherein each boosting circuit has an A node and a B node and is operable in a positive voltage boosting mode to positively boost voltage from the A node to the B node and is operable in a negative voltage boosting mode to negatively boost voltage from the B node to the A node, the method comprising:
applying a first voltage at the A node of one of the boosting circuits in said plurality of boosting circuits in response to a first logic state of an enable signal so that boosting circuits of said plurality of boosting circuits operate in the positive voltage boosting mode to produce a high positive voltage at the second node;
storing charge from said high positive voltage at a positive voltage output;
applying a second voltage at the B node of another of the boosting circuits in said plurality of boosting circuits in response to a second logic state of said enable signal so that boosting circuits of said plurality of boosting circuits operate in the negative voltage boosting mode to produce a high negative voltage at the first node;
storing charge from said high negative voltage at a negative voltage output; and
cyclically switching said enable signal between the first and second logic states to simultaneously generate a positive voltage at the positive voltage output and a negative voltage at the negative voltage output.

21. A charge pump circuit, comprising:
a plurality of boosting circuits coupled in cascade between a first node and a second node, wherein each boosting circuit has an A node and a B node and is operable in a positive voltage boosting mode to positively boost voltage from the A node to the B node and is operable in a negative voltage boosting mode to negatively boost voltage from the B node to the A node;

a first capacitor charged by the plurality of boosting circuits from output at the first node to store a negative voltage;

a second capacitor charged by the plurality of boosting circuits from output at the second node to store a positive voltage;

a control circuit configured to cyclically switch the plurality of boosting circuits between operation in the negative voltage boosting mode to generate the negative voltage on the first capacitor and operation in the positive voltage boosting mode to generate the positive voltage on the second capacitor and so that both the negative voltage and the positive voltage are simultaneously available at the first capacitor and second capacitor, respectively.

22. The charge pump circuit of claim 21, wherein the control circuit generates a periodic enable signal that cyclically switches between a first logic state and a second logic state which is complementary to the first logic state, the control circuit comprising:

a first switching circuit configured to apply a first voltage at the A node of one of the boosting circuits in said plurality of boosting circuits in response to the first logic state of the periodic enable signal when the plurality of boosting circuits are operating in the positive voltage boosting mode; and a second switching circuit configured to apply a second voltage at the B node of another of the boosting circuits in said plurality of boosting circuits in response to the second logic state of the periodic enable signal when the plurality of boosting circuits are operating in the negative voltage boosting mode.

23. The charge pump circuit of claim 22, wherein the first voltage is a positive voltage and the second voltage is a ground voltage.

24. The charge pump circuit of claim 22, wherein the first switching circuit comprises:

a switching transistor that is gate controlled by said periodic enable signal; and a cascode transistor coupled in series with the switching transistor between the first voltage and the A node of said one of the boosting circuits in said plurality of boosting circuits.

25. The charge pump circuit of claim 24, wherein the cascode transistor is biased to be always turned on.

26. The charge pump circuit of claim 22, wherein the second switching circuit comprises:

a switching transistor that is gate controlled by said periodic enable signal; and a cascode transistor coupled in series with the switching transistor between the second voltage and the B node of said another of the boosting circuits in said plurality of boosting circuits.

27. The charge pump circuit of claim 26, wherein the cascode transistor is biased to be always turned on.

28. The charge pump circuit of claim 21, further comprising:

a first diode having a cathode connected to the first node and an anode connected to a terminal of the first capacitor; and a second diode having an anode coupled to the second node and a cathode coupled to a terminal of the second capacitor.

* * * * *